Jan. 15, 1957 H. E. BRAFMAN 2,777,976
HIGH VOLTAGE CAPACITOR
Filed May 24, 1955

HAROLD E. BRAFMAN
INVENTOR.

BY
Connolly and Hutz
ATTORNEYS

United States Patent Office 2,777,976
Patented Jan. 15, 1957

2,777,976
HIGH VOLTAGE CAPACITOR

Harold E. Brafman, North Adams, Mass., assignor to Sprague Electric Company, North Adams, Mass., a corporation of Massachusetts Application May 24, 1955, Serial No. 510,740

4 Claims. (Cl. 317—261)

The present invention relates to capacitors that are to be used at high operating potentials, that is up to 30,000 or more volts.

While capacitors of the above type are known, such capacitors are of relatively complex mechanical construction, generally calling for a plurality of structural components to hold the parts in suitable relationship and protect them as well as their surroundings from undesirable effects of the high voltage.

Among the objects of the present invention is the provision of novel high voltage capacitors that are of relatively simple construction.

The above as well as still further objects of the present invention will be more clearly understood from the following description of several of its exemplifications, reference being made to the accompanying drawings, wherein.

A high voltage capacitor of the present invention has a series connected stack of varnish-impregnated capacitor sections each of which includes a multiplicity of interleaved copper foils between ½ and 2 mils thick insulated from one another of mica sheets, the alternate foils of the individual sections being connected in parallel, terminals connected to the ends of the stack, and a resin casing at least about one-eighth inch thick molded directly about the stack and the adjacent portions of the terminals, and clamping the stacked components together.

One group of parallel connected foils project from one side of the stack and another group of parallel-connected foils project from another side of the stack, and the projecting portions of the foils are soldered together on the respective sides to provide the parallel as well as the series connections. In addition, it is preferred that the projecting foil portions be not more than about 3/32 inch long and the individual sections be separated by mica sheets thicker than the sheets separating the individual foils and projecting between and beyond adjacently positioned series soldered connections.

A further desirable feature is to have each terminal include a metal foil at least 5 mils thick overlying one end of the stack, a mica spacer between the terminal foil and the adjacent end section, the terminal foil having an edge soldered to the outer electrode connection of the adjacent end section, a terminal stud having an enlarged head end section, a terminal stud having an enlarged head soldered to the terminal foil, said head being circular in transverse section and confined to the central longitudinal region of the stack, the terminal foil portions remote from its soldered connection being rounded to provide a corner-free shape approximately tangent to the head.

Figure 1:
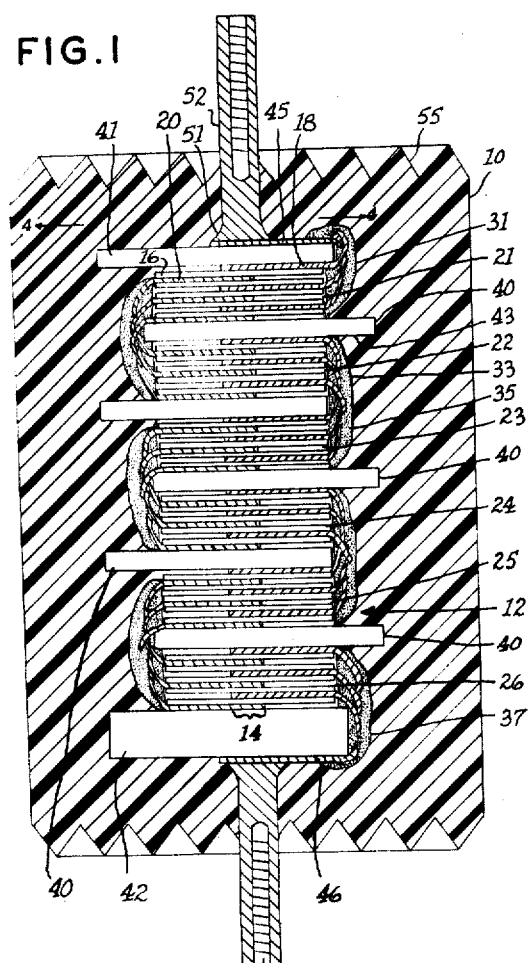
Fig. 1 is a sectional view of a high voltage capacitor, illustrated in the present invention.

Referring now to the drawings, the capacitor of Fig. 1 is essentially a body 10 of resin, within which is contained a series-connected stack 12 of capacitor sections indicated respectively at 21, 22, 23, 24, 25 and 26. Each section in turn is composed of two banks of copper foils 18, 20 interleaved with each other. The adjacent copper foils are spaced from each other by mica sheets 16 which project on all sides an appreciable distance beyond the region 14 in which the interleaved foils overlap each other. This projection is preferably at least ⅛ of an inch, but for operating potentials of more than about 10,000 volts the projection of the mica along the non-interleaved portion of the foils should be increased somewhat. Thus for operation at 15,000 volts the mica sheets should be large enough so that they extend at least 3/16 of an inch beyond the recessed foil edges.

The assemblies of foils 18, 20 and mica sheets 16 are impregnated by varnish which is not shown in the drawing but which fills all voids and spaces in the sections and also covers all exposed surfaces. From opposite ends of such impregnated sections, the outer margins of the respective banks of foils project. These projecting margins of the adjacent foils are soldered together so that the individual foils of each bank are connected in parallel. Some of these soldered connections are shown at 31, 33, 35 and 37. These soldered connections themselves are also connected together in a chain so as to place the sections electrically in series connection. As shown for example, soldered connections 33 and 35 are joined to each other while the opposing banks of foils in sections 22 and 23 are connected to the correspondingly located banks of the adjacent sections on opposite sides of the stack.

In order to suitably insulate the adjacent soldered connections that are spaced from each other, thick dielectric sheets or blocks 40 of mica, for instance, are interposed between the adjacent sections. These blocks are dimensioned so as to project between and beyond the soldered joints, as indicated at 43. The blocks 40 are also made thicker than the dielectric spacers 16 and can also project beyond the sections on all sides of the stack except the side at which the bridging series connections are located. In the interest of clarity the various thicknesses of the individual separators, as well as the foils, have been exaggerated.

At each end of the stacked combination of sections there are provided additional spacers 41, 42. These can be identical with spacers 40, and if desired either or both of these end spacers can be varied in thickness so as to build the stack up to the desired overall height. It is generally simpler to confine the adjustable block thickness to one end of the stack as indicated at 42 and have the other spacer 41 of the standard thickness corresponding to that of spacers 40. However, spacers 41 and 42 can both be arranged to extend in the same manner as the intermediate spacers 40.

Terminal connections to the stack are shown as provided by terminal foils 45, 46 on the outside of the outer spacers 41, 42. The terminal foils are desirably made thicker than the electrode foils 18, 20, and have one end projecting across an edge of the adjacent spacer and soldered to the respective outer solder connections 31, 37 of the series. Against the outer faces of terminal foils 45, 46 are placed the enlarged heads 51 of terminals studs 52. Soldered connections can also be made between the heads and the terminal foils.

The entire stack, including the nearby portions of the studs, is encased in the resin mass 10 which can be molded in place to leave the outer ends of the studs uncovered. These ends can be used as terminals for the capacitor. The exposed ends of the studs can be shaped to facilitate connection, as by internal longitudinal threads 54, or by providing suitable external flats, external lugs, or the like.

Although it is not essential even for extremely high voltages, it is sometimes desirable to apply ridges to the outer surface of the resin spacing 10 as indicated by the concentric circular grooves 55 for example, since this will help reduce the possibility of electrical breakdown along a conducting path provided by the outer surface of the casing when the surface becomes contaminated with moisture or other materials that do not make good insulation.

Figure 2:
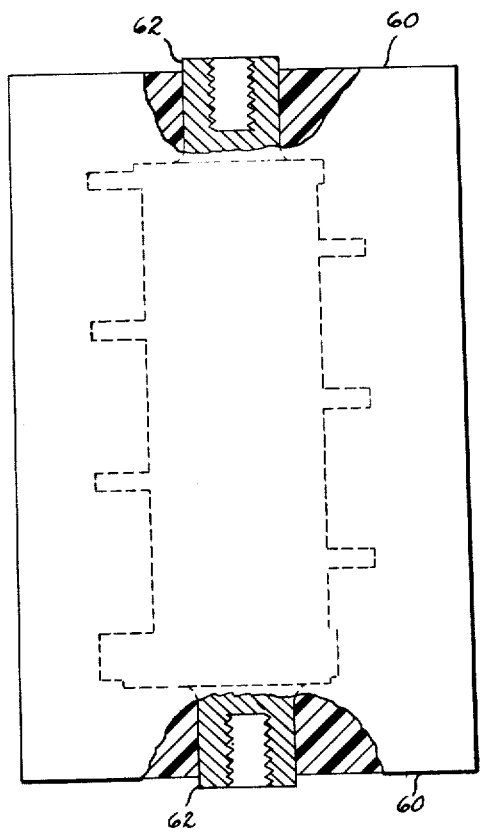
Figs. 2 and 3 are partly sectional views of modified types of high voltage capacitors embodying the present invention.

Fig. 2 shows a capacitor which can in general be similar to that of Fig. 1 but with the terminal ends 60 of the casing ungrooved. In addition, the construction of Fig. 2 has terminal studs 62 which project only a short distance beyond the surfaces of ends 60. This construction is particularly suited to take the place of the high voltage transmitter type mica capacitor of the prior art in which the capacitor assembly is surrounded by a ceramic sleeve and clamped between metal plates.

Figure 3:
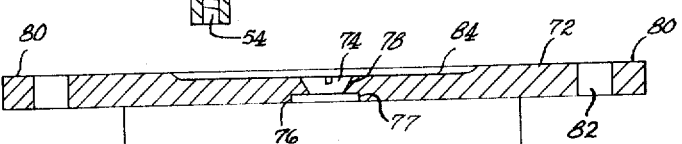

Fig. 3 illustrates such a replacement in accordance with the present invention. Here a capacitor 70 having a construction such as that shown in Fig. 2 carries at each terminal end a metal plate 72 which is held in place as by a screw 74 threadedly engaged in the terminal threads of the terminal studs 76. For added compactness the screw 74 can be of the flat head type and can be received in a counter-sunk socket 78 in the respective plates 72. In accordance with the standard practice, the plates can be of generally circular form with projecting ears 80 having mounting apertures 82. The outer faces of the plates can also be recessed as indicated at 84 to assure that the heads of screws 74 do not project beyond these faces. With this arrangement individual capacitor combinations can be conveniently mounted one above the other and connected together by bolts or the like passing through aligned ears in the plates of adjacent capacitors.

Under some circumstances it may be desirable to assure that the capacitor 70 is non-rotatably held between its respective plates. This is readily provided by shaping the projecting portions of terminal studs 76 so that they are non-circular in transverse section and provide a correspondingly shaped recess 77 in the plates. The recess acts as a socket holding the respective studs in non-rotatable position. Alternatively, supplemental fasteners such as one or more additional screws can be provided around each screw 74 to lock the respective metal plates against rotation with respect to the capacitor terminal ends. Such additional screws can be of the self-tapping variety placed in preformed sockets of the respective plates and forced into the end faces of the resin casing of the capacitor. Since the additional screws are only relied upon to prevent relative rotation they need not be deeply embedded in the resin. An engagement of only about 1/16 of an inch is generally sufficient. If desired, however, the end faces of the resin casing can be previously threaded and tapped, or even provided with threaded inserts that are molded in place, as for example by the same molding operation in which the casing is molded around the capacitor stack.

In the above construction it has been discovered that the molding operation will generally damage the foils unless they are made of copper and are at least ½ mil thick. For practical constructions the foils 18, 20 should not be more than 2 mils thick. A particularly satisfactory foil thickness is 1 mil. To simplify the assembly operations, the foils can be pre-tinned either over their entire surfaces or merely over those portions to which the solder connections are to be applied. Terminal foils 45, 46 should be sufficiently thicker, a 5 mil thickness being very suitable although anything above 3 mils appears to be satisfactory. Furthermore, the foils are also more likely to tear if they project beyond their dielectric spacers more than about 3/32 of an inch even though these projections are completely enveloped in solder.

The terminal foils should also be free of corners. The enlarged heads 51 of the studs should also be free of corners and preferably rounded or circular in transverse section. It is particularly desirable to shape the rounded portion of the terminal foils so that each is substantially tangent to the rounded edge of the terminal heads 51.

Any standard type of varnish can be used for the impregnation of the individual sections. Suitable baking varnishes include the silicones, polyesters and phenol-aldehydes such as phenol formaldehyde. It is preferred to repeat the varnish impregnation in order to assure a long lived product. The solder connections can be made directly to the varnish covered foil edges without the prior scraping off of the varnish. A lead-tin solder such as one containing 40 to 60% tin by weight, gives much better results than aluminum solders.

The resin casing 10 should be of the thermosetting type to provide the best clamping of the resin. Alkyd resins, as for example, glycerinephthalic acid condensation products with or without fillers such as ground mica, clay or the like, make a very effective casing. Other suitable resins include phenol-aldehyde, urea-aldehyde, phenol-aniline, phenol - aniline - aldehyde, melamine - aldehyde, cross-linked polyesters of unsaturated esters and even epoxy resins of the type described in the Narrocott article in British Plastics, issue of October, 1951, pages 341–345. Up to about 50% of inert filler can be incorporated in the resin without seriously detracting from its ability to securely clamp the stack in place. For best results the wall thickness of the resin casing should be not less than ⅛ of an inch around the stack.

Figure 4:
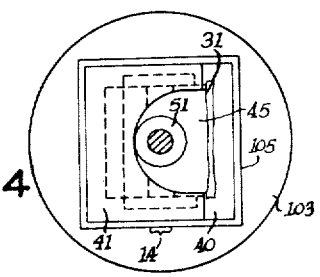
Fig. 4 is a sectional view along line 4—4 of Fig. 1 before it is molded.

The resin casing can be produced by any of the conventional techniques including casting and injection molding, however best results are obtained through the use of molded preforms followed by compression molding. The preform preferably is of the same configuration as the active capacitor element, for the percentage of rejects is somewhat increased when a square or rectangular stack is molded in a hollow preform having a cylindrical wall engaging the stack. Fig. 4 shows a preform 103 with an inner surface 105 matching that of the stack. Best results are also obtained when the stack is securely clamped in place, as by axial members extending from the terminal studs until the mold is fully closed and the resin cure about completed. Any flashing at the parting surface can then be readily removed either by hand or with a tool such as a file, grinding wheel, etc. Molding pressures of 500 to 10,000 pounds per square inch can be used, along with molding temperatures of from 100 to 300° C. With alkyd resins, for example, a pressure of 2,000 pounds per square inch and a molding temperature of 150° C. is very effective.

A feature of the present invention is that the capacitors produced as indicated above are not only of outstanding quality but they can be effectively used at temperatures higher than heretofore considered practical for resin-encased mica capacitors. By way of example, capacitors molded with 50% mica filled alkyd in the manner described above and having 1 mil tinned copper electrode foils, 5 mil terminal foils, 2¼ to 2½ mil mica dielectrics and having 15 sections giving an overall capacitance of 27 micromicrofarads at 16 kilovolts can be used at that voltage at temperatures as high as 130° C.

The numbers of sections used in the condensers of the present invention can be varied from about 2 to about 30 or more. The two section assembly will generally be satisfactory for use at an operating potential of several thousand volts. For the closest tolerances in the final capacitance, the individual sections should have their separate capacitance measured after varnish impregnation, and suitably matched to avoid having all sections on the high capacitance side, on all on the low capacitance side. There is generally an increase in capacitance of 10 to 20% contributed by the final molding operation so that the initial capacitance can be held to a correspondingly lower value. The number of electrode foils in one section can be varied from 5 to 50 or more depending upon how much capacitance is needed per section and how much recessing is desirable for the overlapping portions of the foils. In addition to a resin casing having an external cylindrical shape, it can also be rectangular, square, polygonal, etc., in cross-section, if desired.

As many apparently widely different embodiments of this invention may be made without departing from the spirit and scope hereof, it is to be understood that the invention is not limited to the specific embodiments hereof except as defined in the appended claims.

What is claimed is:

1. A high voltage capacitor having a series-connected stack of varnish-impregnated capacitor sections each of which includes a multiplicity of interleaved copper foils between ½ and 2 mils thick insulated from one another by mica sheets, the alternate foils of the individual sections being connected in parallel, terminals connected to the ends of the stack, and a resin casing at least about one-eighth inch thick molded directly about the stack and the adjacent portions of the terminals, and clamping the stacked components together.

2. The combination of claim 1 in which one group of parallel connected foils project from one side of the stack and another group of parallel-connected foils project from another side of the stack, and the projecting portions of the foils are soldered together on the respective sides to provide the parallel as well as the series connections.

3. The combination of claim 2 in which the projecting foil portions are not more than about $3/_{32}$ inch long and the individual sections are separated by mica sheets thicker than the foil spacers and projecting between and beyond adjacently positioned series solder connections.

4. The combination of claim 1 in which each terminal includes a metal foil at least 3 mils thick overlying one end of the stack, a mica spacer between the terminal foil and the adjacent end section, the terminal foil having an edge soldered to the outer electrode connection of the adjacent end section, a terminal stud having an enlarged head soldered to the terminal foil, said head being circular in transverse section and confined to the central longitudinal region of the stack, the terminal foil portions remote from its soldered connection being rounded to provide a corner-free shape approximately tangent to the head.

References Cited in the file of this patent

UNITED STATES PATENTS

| | | |
|---|---|---|
| 1,553,549 | Priess | Sept. 15, 1925 |
| 1,706,816 | Pickard | Mar. 26, 1929 |
| 2,073,355 | Sjith | Mar. 9, 1937 |
| 2,336,091 | Gray | Dec. 7, 1943 |
| 2,436,208 | Dressel | Feb. 17, 1948 |

UNITED STATES PATENT OFFICE
CERTIFICATE OF CORRECTION

Patent No. 2,777,976                                              January 15, 1957

Harold E. Brafman

It is hereby certified that error appears in the printed specification of the above numbered patent requiring correction and that the said Letters Patent should read as corrected below.

Column 1, line 43, for "another of" read -- another by --; line 66, strike out "end section, a terminal stud having an enlarged head"; column 4, line 35, for "rejejcts" read -- rejects --; column 6, line 26, list of references cited, for the name "Sjith" read -- Smith --.

Signed and sealed this 24th day of December 1957.

(SEAL)
Attest:

KARL H. AXLINE
Attesting Officer

ROBERT C. WATSON
                                                                       Commissioner of Patents